United States Patent
Abrahams et al.

(10) Patent No.: US 9,720,656 B2
(45) Date of Patent: *Aug. 1, 2017

(54) METHOD AND APPARATUS FOR ENABLING AGILE DEVELOPMENT OF SERVICES IN CLOUD COMPUTING AND TRADITIONAL ENVIRONMENTS

(71) Applicant: International Business Machines Corporation, Armonk, NY (US)

(72) Inventors: Faried Abrahams, Laytonsville, MD (US); Vijayaganesh Subramanian, Bangalore (IN); Sandeep Patil Ramesh, Pune (IN); Gandhi Sivakumar, Bentleigh (AU); Lennox Epstein Thomas, Decatur, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/142,566

(22) Filed: Apr. 29, 2016

(65) Prior Publication Data

US 2016/0239271 A1    Aug. 18, 2016

Related U.S. Application Data

(63) Continuation of application No. 13/833,103, filed on Mar. 15, 2013, now Pat. No. 9,367,289.

(51) Int. Cl.
*G06F 9/44* (2006.01)

(52) U.S. Cl.
CPC ............... *G06F 8/315* (2013.01); *G06F 8/33* (2013.01)

(58) Field of Classification Search
None
See application file for complete search history.

(56) References Cited

U.S. PATENT DOCUMENTS

| | | | |
|---|---|---|---|
| 6,356,913 B1 * | 3/2002 | Chu | G06F 17/30294 |
| 6,448,980 B1 | 9/2002 | Kumar et al. | |
| 6,639,980 B1 | 10/2003 | Weiss et al. | |
| 7,797,336 B2 * | 9/2010 | Blair | G06F 17/30011 |
| | | | 707/773 |
| 2006/0130038 A1 * | 6/2006 | Claussen | G06F 8/24 |
| | | | 717/168 |
| 2010/0229241 A1 | 9/2010 | Liu et al. | |
| 2011/0035435 A1 | 2/2011 | Meng et al. | |
| 2012/0047506 A1 | 2/2012 | Maes | |

OTHER PUBLICATIONS

"C++ How to Program", Sixth Edition by P. J. Deitel, Deitel & Associated, Inc., Published 2007, pp. 27-28 and 265-267.*
Liddle et al.; "An Active, Object-Oriented, Model-Equivalent Programming Language"; Advances in Object-Oriented Data Modeling, MIT Press, 2000, pp. 333-361.
Deneckere et al.; "Patterns for Extending an OO Model with Temporal Features"; 1998 International Conference on Object-Oriented Information Systems, Paris Proceedings, Sep. 9-11, 1998, pp. 201-218.

* cited by examiner

*Primary Examiner* — Evral E Bodden
(74) *Attorney, Agent, or Firm* — Whitham, Curtis & Cook, PC; John R. Pivnichny

(57) ABSTRACT

Prepending a name object or setting a type of a software object to a name and prepending a value object to the software object provides inheritance of a name value pattern by the software object to establish particular types or classes of attributes of the software object without modification of the software object itself that is thus strongly typed and accessible by type.

12 Claims, 5 Drawing Sheets

METHOD AND APPARATUS FOR ENABLING AGILE DEVELOPMENT OF SERVICES IN CLOUD COMPUTING AND TRADITIONAL ENVIRONMENTS

CROSS-REFERENCE TO RELATED APPLICATIONS

This application is a continuation of and claims priority to U.S. patent application Ser. No. 13/833,103, filed Sep. 18, 2014, now U.S. Pat. No. 9,367,289, which is hereby incorporated by reference it its entirety.

FIELD OF THE INVENTION

The present invention generally relates to development of software to provide services to clients through object-oriented design and, more particularly, to providing flexibility at the attribute level for developing object-oriented custom software of arbitrary functionality.

BACKGROUND OF THE INVENTION

High speed data communication networks such as the Internet and private networks have spread virtually worldwide in recent years, allowing access to vast amounts of information from many types of devices ranging from large mainframe computers to portable devices such as so-called smart phones. Conversely, it has become largely immaterial where various data processing resources or interactive terminals are located. Therefore, data processing tasks can be and often are distributed over numerous data processors which communicate with each other through a network such as the Internet or virtual private networks (VPNs) while interaction with such resources can be achieved from a wide variety of fixed or portable devices at arbitrary locations. This capability, in turn, allows people and businesses with data processing needs to avoid some expenses for acquiring and maintaining data processing resources by acquiring such capability as services from a provider that then assumes such costs and responsibilities. Accordingly, the provision of such services is rapidly becoming a major industry, often referred to as "cloud computing", which is a collective term referring to all such services that can be provided by networked data processing resources.

These services fall into three basic categories referred to as infrastructure as a service (IaaS), platform as a service (PaaS) and Software as a service (SaaS). IaaS provides basic networking, load balancing, content delivery and storage, data base management, routing, and hosting of operating systems. PaaS provides a platform for development of software applications with immediate abstractions of the underlying infrastructure. SaaS provides software solutions to system clients and access to data (including database management) that may be internal to a client system or delivered over a network such as the Internet. A cloud service provider (CSP) may provide any combination of such services to a client and the needs of a given client may be substantially unique and involve an arbitrary degree of complexity. For example, each client will have different needs for data and each data base, in theory, will need to be uniquely organized, whether unique to the client or commercially available to any client. Similarly, for software, the needs of each client will differ and may be extremely complex, such as for managing data delivery and documentation of large projects developed by large groups of persons having a wide variety of expertise in different subject matter areas, sometimes referred to as an enterprise or enterprise system through which communications, product development and documentation are accomplished. The cloud service provider (CSP) must be able to provide customization of resources such as databases and software to meet the needs of clients, whatever those needs might be.

As an approach to developing software involving an arbitrarily high degree of complexity, so-called object oriented programming or system design was introduced about twenty years ago. The basic concept of object oriented design is to dissect a problem of any degree of complexity into a hierarchy of discrete portions, referred to as objects, with a sufficient degree of granularity that each object, itself, can be very simple and possibly generalized to allow re-use of previously developed software objects to perform, with suitable modifications, similar functions. Each object possesses attributes which can be inherited from objects higher in the hierarchy and encapsulates or hides properties of objects lower in the hierarchy. Each object has a function of returning a result when invoked and may require other objects or resources to perform various portions of that function while the process performed by any given object is not necessarily known to the object above it in the hierarchy which invokes the object. Thus any problem of any degree of complexity can be represented by a network of objects connected by pointers to other objects to invoke those objects and obtain a particular result in response.

Such object oriented design has the benefit of being able to leverage and re-use the software constituting each object since a given object may be invoked by any number of objects potentially having much different functionalities. Further, since properties of hierarchically lower objects are encapsulated or hidden, problems of compatibility between the processes performed by any given object are largely avoided. Since a given object can be used by different objects, the volume of software required for a given function and its cost of development are potentially minimized. On the other hand, a given object oriented design tends to be either relatively rigid and difficult to modify or adapt, particularly at the attribute level due to abstraction at the object level, or complex to implement for obtaining flexibility at the object level.

SUMMARY OF THE INVENTION

It is therefore an object of the present invention to provide an apparatus and method for achieving flexibility at the attribute level of a software object to facilitate the development of custom software or modification of existing software objects.

In order to accomplish this and other objects of the invention, a method of providing flexibility at the attribute level of a software object in custom software where the type of attribute can be set to a name and each name can be associated with an optional name object is provided, said method comprising steps of setting a type of attribute of the software attribute, and prepending a value object specifying a value to the software attribute, whereby the name of the name object and the value of the value object form a name value pattern that is inherited by the software attribute.

In accordance with another aspect of the invention, an attribute buoyant enabler apparatus is provided comprising an editor to select and edit a software object, a display to display attributes of the software object and an input device to prepend an optional name object and a value object to the software object whereby a name value pattern is inherited by the software attribute.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED

Embodiment of the Invention

Figure 1A:
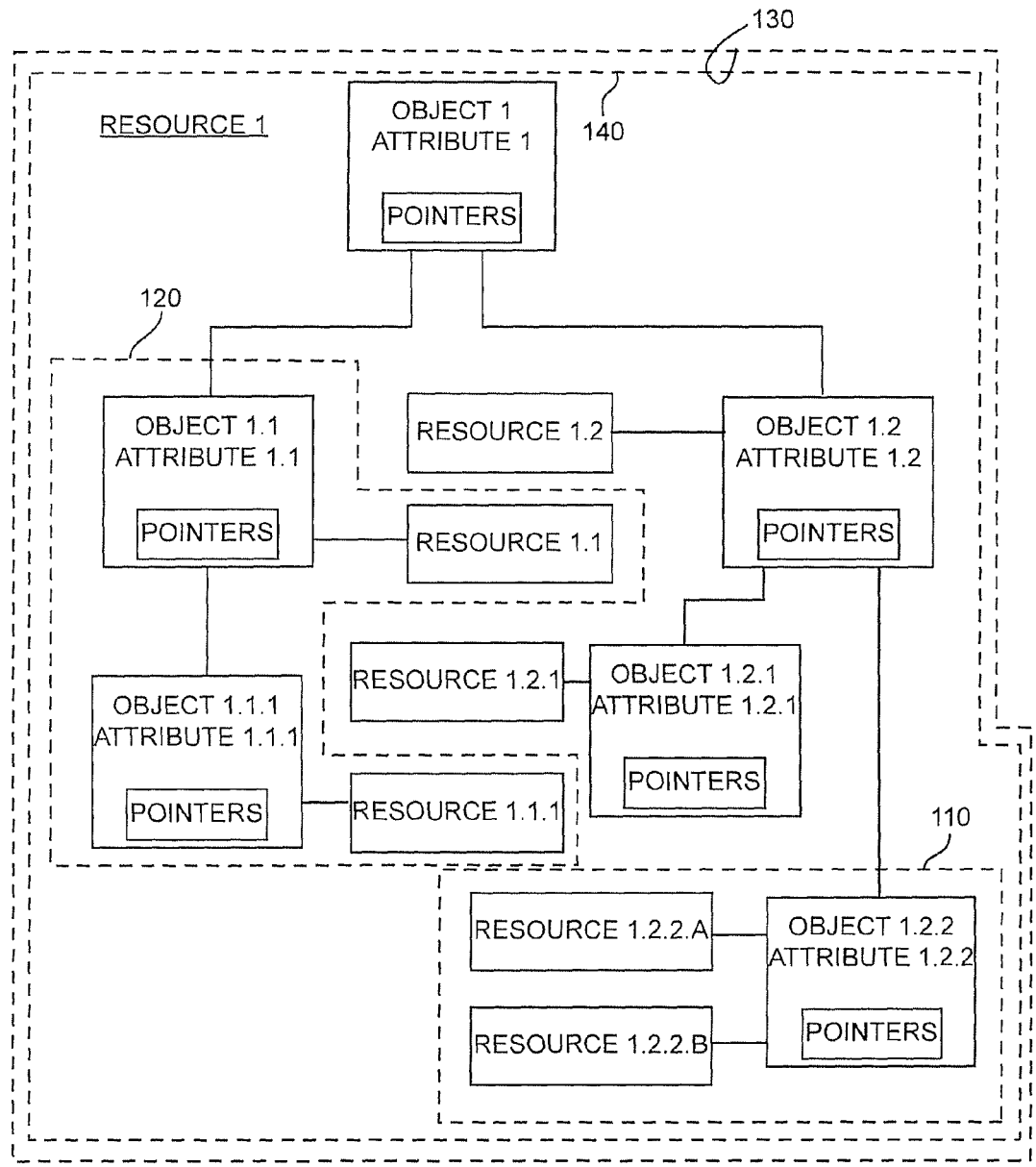
FIGS. 1A and 1B are high level block diagrams or data flow diagrams useful for conveying an understanding of the problem addressed by the invention.
Figure 1B:
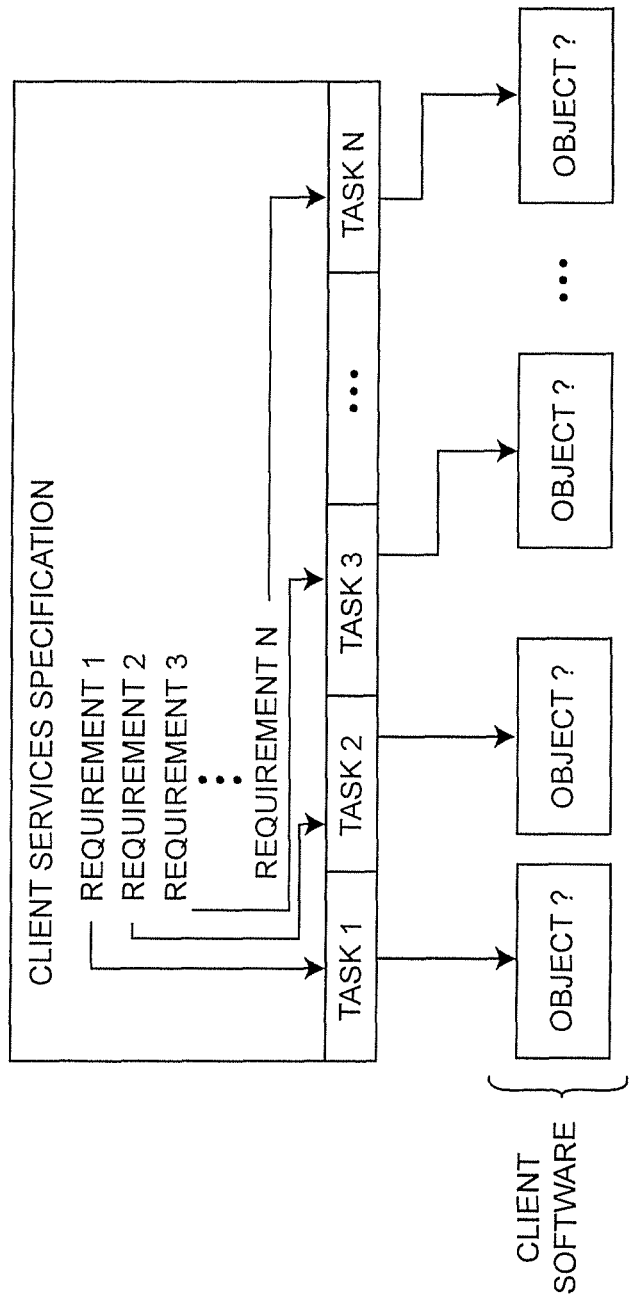

Referring now to the drawings, and more particularly to FIG. 1A and 1B, an object oriented model and a model based approach to design of an IaaS or SaaS service are schematically illustrated, respectively. At the level of abstraction portrayed in these illustrations, those skilled in the art will recognize that both Figures may be understood as either block diagrams or data flow diagrams. Further, at the illustrated level of abstraction and generalization, the invention may or may not be illustrated in these Figures. Therefore no part of either Figure is admitted to be prior art in regard to the present invention.

FIG. 1A illustrates a hierarchical tree structure of objects for performing an arbitrary task. Each object is illustrated as having at least one resource (or, more properly and for generality, referred to as a property or properties of the objects hierarchically below it which are hidden by the object) associated therewith that is used in performance of its associated function. Note that for object 1, the entire hierarchy of objects below it constitute resource 1, indicated by dashed line 140 of which there may be a plurality. Each object has at least one attribute (only one being depicted for each object) which establish the type or class to which the object belongs in accordance with its function. However, as alluded to above, additional attributes may be inherited from objects hierarchically above the object including whether the inherited attribute is mandatory or optional. Each object also includes pointers to particular resources (e.g. other objects having and hiding their own set of properties of hierarchically lower objects) to be used in performing its function and pointers to other objects for performing portions of the function of each respective object, which are thus resources or properties of the object and returning a result when the function of the object is completed.

Each object collection that forms a functional component of the software can be considered as having a boundary 110, 120, 130 that establishes the entities involved in performing the function of the object and, importantly, the root entity for all objects below it in the tree hierarchy. For example, for object 1.2.2 at the lowest or leaf level of the tree hierarchy, boundary 110 delimits a single object and its associated resources while for object 1 as the root entity, the boundary 130 depicted by a double dashed line would comprehend the entirety of FIG. 1A. At levels below that of the root entity and above the leaf level the boundary of a given object, for example object 1.1, would comprehend that object and all hierarchically lower objects (e.g. object 1.1.1 at the leaf level under object 1.1) required to perform its function. Conversely, for example, object 1 or object 1.1 may be considered a root entity in regard to object 1.1.1, depending on the object boundary. Thus, as alluded to above, each object encapsulates or hides the relationships or resources associated with it as well as associated objects that are lower in the hierarchical tree and which are manifested in the object only as pointers while each object inherits all attributes of all objects above it in the hierarchical tree. Therefore, neither the inherited attributes nor the identities of relationships or resources (e.g. those of hierarchically lower objects) need be specified in a given object.

A model based design is illustrated in FIG. 1B begins with a specification of required services and/or functionality. This specification can then be broken down into individual requirements (e.g. requirement 1, requirement 2, . . . requirement N) for which individual tasks can be determined and to which the client requirements are mapped. To develop the required software for providing required services to a client with arbitrary requirements, it is then necessary to map the tasks to particular objects which may already exist in the object or client software libraries of the CSP and to make any necessary modifications thereto, although the CSP may occasionally develop a special purpose object to meet a requirement of a potential client. Even in such a case, such a special purpose object may be custom assembled from other objects that may already exist. In other words, in model based design, component boundaries are defined and artifacts of the requirements are often generated automatically as incidents of the model based design process.

Thus, the development of custom software in a sufficiently short time to be adequately responsive to existing or potential clients of a CSP is essentially a matter of selecting and modifying existing objects and mapping them onto required tasks developed through model based design. Therefore, when a CSP creates a custom software system, there is a need to develop flexibility at various levels in order to meet client requirements which may be unforeseeable and to reduce capital expenditures in developing such software. The underlying components which perform the relevant and required functionality are built using software objects or entities; groups of which are also collectively referred to as classes. Since required future functionalities cannot be anticipated, previously designed components to be used in the custom software must be agile to allow relatively convenient selection and modification at all levels, including the attribute level. The current model of defining attributes, however, is static and imposes substantial rigidity at the attribute level.

While attributes can be established within an object, the attribute name value carries little information that can serve to define it and is necessarily abstract and, hence, rigid. Grouping of objects by type is at the class level and does not enable flexibility at the attribute level even though alteration of a type pattern enables changing the context of the entire object. Providing name value pairs for attributes is also at the object level and is abstract. Providing alternative values (sometimes referred to as comma separated values) for attributes is enabled at the object level and greatly complicates implementation of custom objects.

To avoid these problems and to achieve flexibility of objects at the attribute level, the invention provides an apparatus and methodology referred to as an attribute buoyant enabler (ABE) which enables a graphic user interface (GUI) for defining types of attributes and providing additional details of attributes through comma separated values which ensures flexibility at the attribute level. In addition, the ABE also enables optionally associating the type attribute specifying a name to an attribute of the software object, and prepending a value object specifying a value to an attribute of the software object. Optionally, a name object specifying a name can also be prepended to the software object's attribute causing the name to be used by the software objects associated with a value. Either of these alternatives establishes one or more name value pairs to assure flexibility at the attribute level of the software object. The invention essentially allows a software developer to use a GUI to generate objects through a process similar to simple editing of a generic object which can then be placed directly above an object of interest in an object hierarchy to cause modification of attribute(s) of an object of interest.

Figure 2:
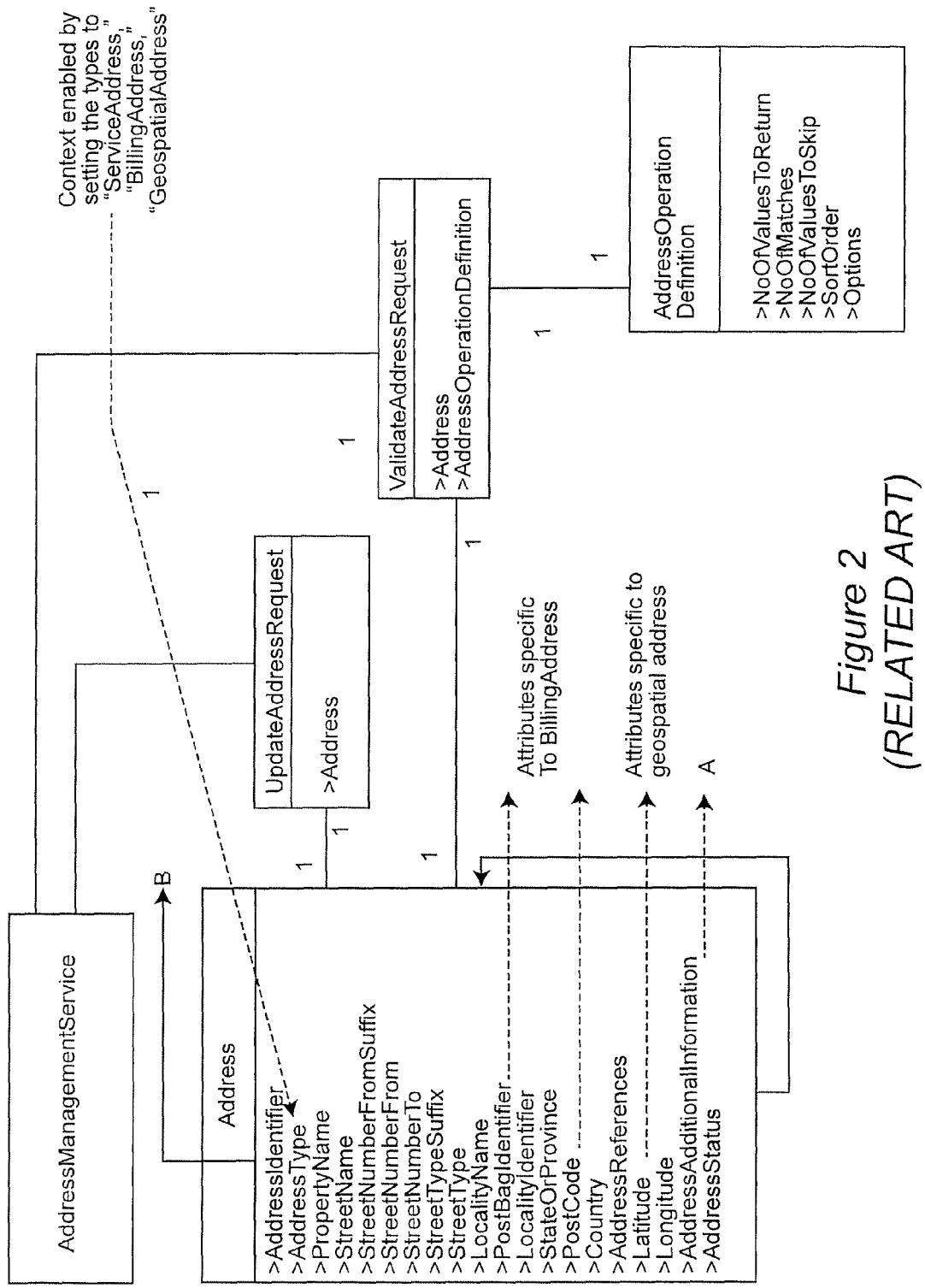
FIG. 2 is a block diagram or data flow diagram of a software object illustrating the problem addressed by the invention.
Figure 3:
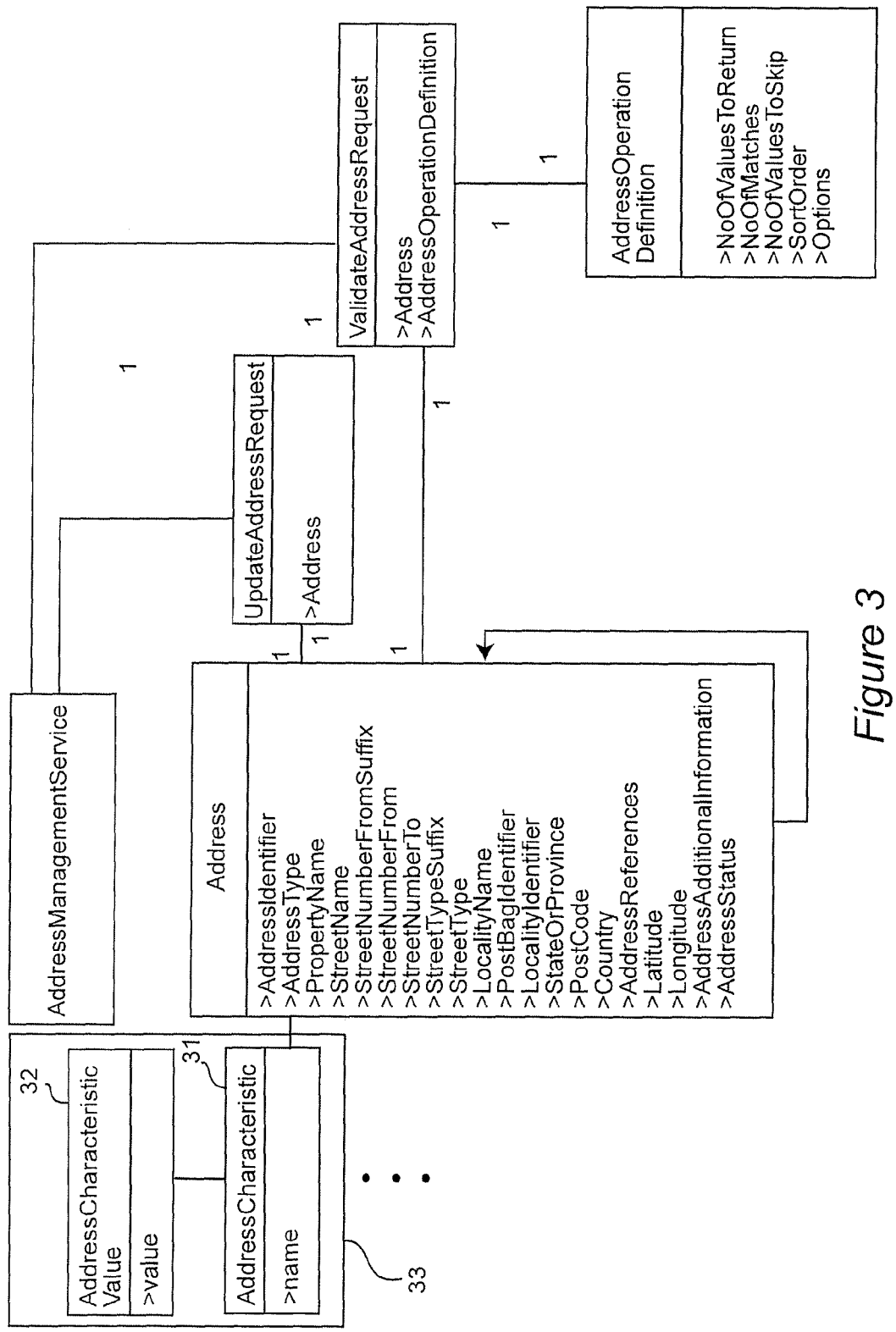
FIG. 3 is a block diagram or data flow diagram of the software object of FIG. 2 and including an exemplary application of the invention.

It should be understood that the exemplary component illustrated in FIG. 2 is merely an example of a component architecture including several objects arranged to convey an understanding of the invention through comparison with FIG. 3. Therefore, while the invention is not illustrated in FIG. 2, no portion of FIG. 2 is admitted to be prior art as to the present invention. Accordingly, FIG. 2 has been labeled "Related Art".

Consider a SaaS component as illustrated in FIG. 2 created to manage addresses for a business that may maintain different addresses for different interactions such as correspondence, product or service delivery, billing and the like with clients of the business. The component, AddressManagementService has two basic functions: UpdateAddressRequest and ValidateAddressRequest, both of which use an object named Address with the attributes as illustrated and return associated responses; the former returning an address for editing and the latter returning an address for performing any of the operations defined in the AddressOperationDefinition object. (The cardinality of these objects is indicated by the numerals adjacent the lines representing their relationships.) Note that the Address object is depicted with a re-entrant arrow at the lower right which is referred to as a self-referencing pattern of the object itself since an object can contain an arbitrary number of instances of the object within itself.

To obtain a degree of flexibility in such a component, an attribute of the Address object is AddressType to accommodate a ServiceAddress that uses all of the other illustrated attributes, a BillingAddress that uses the attributes PostBagIdentifier and PostCode, and a GeospatialAddress that uses the Latitude and Longitude attributes.

Now assume that a potential client or tenant of the CSP requires address management that includes the additional attributes of AddressIdentifierOld, AddressIdentifierNew, PropertyNamePrimary and PropertyNameSecondary. In the component model of FIG. 2, such attributes can be provided by placing the additional information under the AddressAdditionalInformation attribute or adding attributes corresponding to the additional (e.g. old or secondary) information. Placing the additional information under the AddressAdditionalInformation attribute (as indicated by arrow B) results in a weakly typed interface since the nature of the additional information under such a single attribute is not specifically defined and thus cannot be directly accessed by the type (e.g. "old" or "secondary") of the information. If additional attributes are added to the Address object as indicated by arrow A), issues of versioning of the Address object, backward and forward compatibility and the like are virtually assured and inherent.

Referring now to FIG. 3, the accommodation of additional data in a strongly typed and yet simple manner in accordance with the invention is illustrated. It will be observed that FIG. 3 is identical to FIG. 2 except that two additional objects 31, 32 are added. Object 31 provides one or more names as attribute(s) of the AddresssCharacteristic attribute and object 32 provides one or more values as attribute(s) of the AddressCharacteristicValue attribute. These attributes that form a name value pattern 33 are inherited by the Address object as alluded to above. An arbitrary number of name value pairs or patterns can be provided for any or all attributes of any object as indicated by dots in FIG. 3. It should also be noted that a name value pair or pattern can be made generic to all attributes of an object or made specific to any one or more of the attributes of an object. Each such attribute added in such a manner enables the definition of a type attribute and establishment of a type parameter for attributes of the Address object. Thus, for example, the name value pattern inherited by the attribute AddressIdentifier and PropertyName will enable the setting of many types of address identifying information such as AddressidentifierOld and PropertyNameSecondary to directly accommodate the additional information required by a potential client or tenant while not requiring any modification of the component of FIG. 2. In this way, substantial latitude and flexibility for modification and adaptation of an existing or specially developed object is provided at the attribute level.

Figure 4:
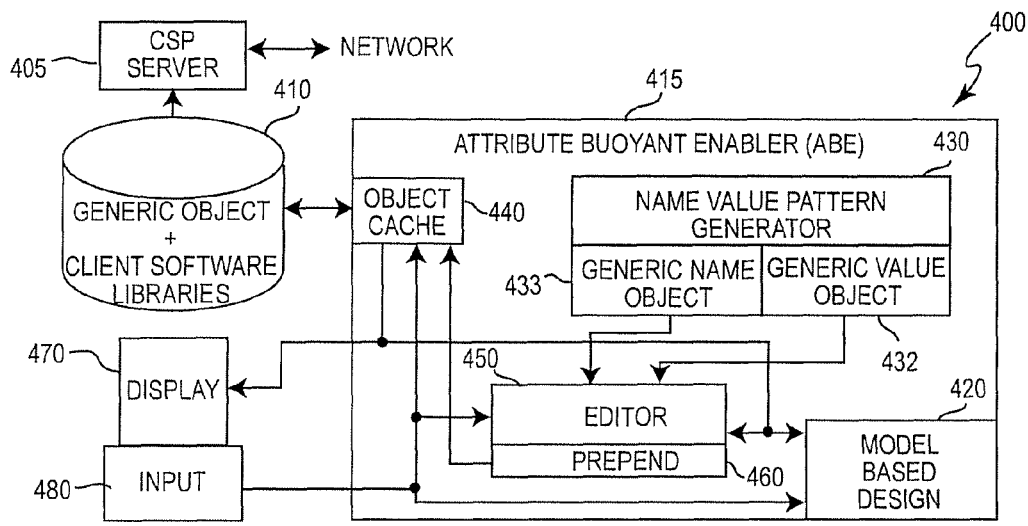
FIG. 4 is a block diagram or data flow diagram illustrating an exemplary processing architecture for practice of the invention.

Referring now to FIG. 4, an exemplary processing architecture 400 for practice of the invention will now be discussed. A CSP server 405 interfaces with a network to provide SaaS and IaaS services to clients but could also provide PaaS services through use of the invention to other CSPs that do not yet possess the capabilities of the invention for facilitating development of custom software that is flexible at the attribute level for clients needing such flexibility. CSP server 405 interacts with software library 410 that contains both generic objects from which custom software can be developed and custom software that may have been developed for existing clients. The attribute buoyant enabler (ABE) 415 in accordance with the invention may be provided as part of the CSP server or as one or more separate processors which also communicate bidirectionally with library storage 410. Storage 420 is preferably but optionally provided in the ABE 415 for storing a representation of the model based design required by a client or potential client.

A name value pattern generator 430 is preferably provided to store generic name object and generic value object templates 432 and 433, respectively. An object cache 440 is preferably but optionally provided to principally function as a buffer while a candidate object is operated upon by the ABE. An editor 450 is also provided to perform object editing operations in accordance with the invention. Such object editing includes editing an object as a type of the attribute as well as editing one or more generic templates by setting names of name attributes and values of value objects to be prepended to a software object and associating optional name attributes with respective names and establishing additional attribute information through, for example, comma separated values. Editor 450 also includes a prepend element 460 for attaching name value pattern objects to an object of interest at a higher hierarchical level than the object of interest.

Figure 5:
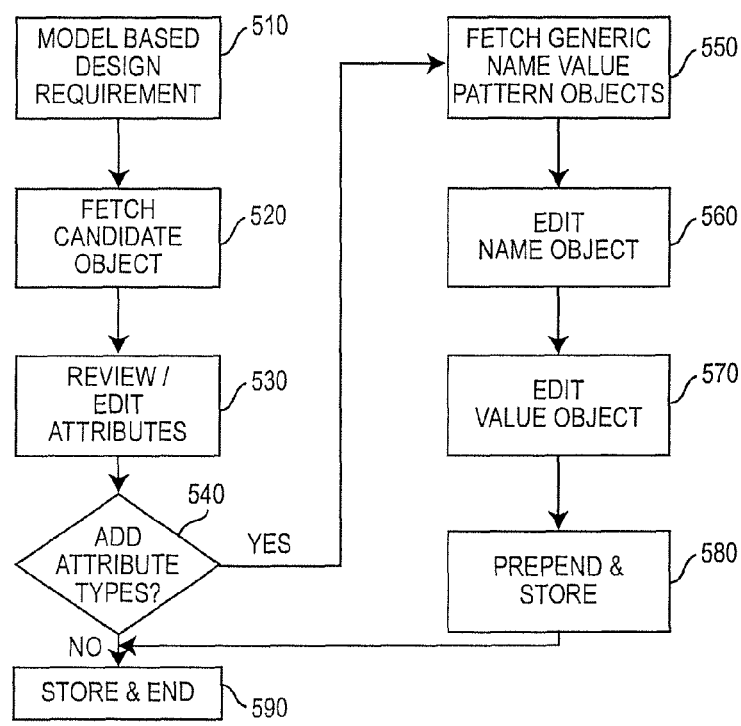
FIG. 5 is a flow diagram illustrating operation and use of the invention.

Operation of architecture 400 will now be discussed in connection with the flow chart of FIG. 5. It will be recalled from the foregoing that client requirements are determined in accordance with model based design, discussed above in connection with FIG. 1B, if the invention is used in such a context. In any case, in the course of software design, the overall functional requirements of the client are divided into particular tasks and the design of custom software is basically a mapping of tasks to particular objects or components (e.g. collections of objects). A task specified in the design is accessed by a user through an input device 480 such as a keyboard, touch screen, mouse, voice recognition or the like and combinations thereof, particulars of which are unimportant to the successful practice of the invention.

The ABE 400 preferably communicates with the user through display 470 which may be visual, tactile or audible or any combination thereof. It is considered preferable that when any access of the model based design is made that an initial display be provided of the combination of tasks required and their respective states of development from which the user can select a particular task on which it may be desired to perform operations in accordance with the invention by selection from a menu or the like. When a task is selected, that information is also provided to editor 450 from the design storage 420 and displayed to the user at display 470 as depicted at 510 of FIG. 5. The user can then evaluate the task and select a candidate object or component to answer the task. The particulars (e.g. at least name and attributes) of the object are fetched (520) from library 410 and optionally buffered in cache 440 from which the particulars of the object are provided to editor 450 and displayed to the user at 470. The attributes of the selected candidate object can then be reviewed and possibly edited by the user as depicted at 530 although editing of attributes is not preferred in accordance with the invention since, as alluded to above problems with versioning and documentation or weak typing of the substance of the editorial revision will generally result. Editing of pointers to customize the object by specification of properties, relationships and resources of the object does not produce such problems and would ordinarily be performed at this point.

Based on the particulars of the task displayed to the user from the model based design 420 or editor 450, and the editorial revisions made to the object, the user can determine if additional types of attributes should be provided as depicted at 540. If not, and the object or component is otherwise satisfactory, the object or component is stored (e.g. returned to cache 440 and library 410 as part of the customized software being developed) and the process ends for the particular task or portion thereof The above operations can then be repeated in regard to any other tasks for which objects are needed in the custom software being developed.

If, however, additional types of attributes are required or if flexibility of the object or component at the attribute level is to be provided, the process in accordance with the invention continues by fetching one or more generic name value pattern object templates from name value pattern generator 430, as illustrated at 550. These templates are provided to editor 450 and are displayed to the user by display 470, from which they may be edited by specification of a name and any other desired information to further define the name object attributes for the name object as depicted at 560 and a value and any other desired information to define value attributes, preferably through comma separated values as depicted at 570. The name value pattern 33 thus established by the edited name object and value object are then optionally prepended to the software attribute of the object of interest (e.g. attached to the software object at a higher hierarchical level) so that the attributes of the name object 31 and value object 32 are inherited by the object of interest. The component (e.g. the combination of the object or component of interest and the name and value objects can then be stored as a completed portion of the custom software and the process ends or is repeated for another task or task portion.

In view of the foregoing, it is clearly seen that the invention provides for further types of attributes to be added to any object during the development of custom software and does so in a manner that provides flexibility at the attribute level without modification of attributes of a template of a generic object for performing particular operations. Since the types of attributes are developed through inheritance in accordance with the invention, the additional attributes are strongly typed and accessible by type. Since the generic template of the object is not modified, all problems of versioning, documentation and the like are avoided. Further, since all modifications of the object of interest other than the customization of pointers are restricted to the objects defining the name value pattern or by setting types of software objects to desired names, with or without providing additional information (e.g. using comma separated values), errors in editing the object of interest, itself, that may alter or prevent operation of the object and which may be particularly difficult to locate and correct after modification of attributes are also avoided and any errors in the pointers or name value pattern objects can be easily found and corrected.

While the invention has been described in terms of a single preferred embodiment, those skilled in the art will recognize that the invention can be practiced with modification within the spirit and scope of the appended claims.

The invention claimed is:

1. A processor for processing a software object having a desired functionality, said software object comprising, in combination,
   a first existing or specially developed software object having a functionality which is less than said desired functionality, said existing or specially developed software object having an attribute with which a type attribute specifying a name is associated or a name object prepended to said existing or specially developed software object setting a type of attribute of said existing or specially developed software object by inheritance as a modification of said first existing or specially developed software object corresponding to said desired functionality, and
   a value object prepended to said first existing or specially developed software object, whereby said name specified by said type attribute or said name object and said value of said value object form a name value pattern that is inherited by said existing or specially developed software object to function as an additional attribute of said existing or specially developed software object to provide additional functionality corresponding to a portion of said desired functionality not provided by said first existing or specially developed software object without adding an additional attribute to said existing or specially developed software object.

2. The software object as recited in claim 1 wherein additional details of attributes of said software object are specified by comma separated values.

3. The software object as recited in claim 1 including a further name object and a further value object associated with another attribute of said existing or specially developed software object, wherein said another attribute is different from an attribute with which said name object and said value object are associated.

4. A method of developing customized software, said method comprising steps of
   mapping a task to be performed by said customized software to an existing or specially developed software object,
   editing said existing or specially developed software object, wherein said editing step associates a type attribute specifying a name to an attribute of said existing or specially developed software object, or prepends a name object specifying a name to said existing or specially developed software object setting a type of attribute of said existing or specially developed software object, and wherein said editing step further provides prepending a value object specifying a value to said existing or specially developed software object or said name object, whereby said name specified by said type attribute or said name object and said value of said value object form a name value pattern that is inherited by said existing or specially developed software object to function as an additional attribute of said existing or specially developed software object without adding an additional attribute to said existing or specially developed software object.

5. The method as recited in claim 4, including a further step of
   editing a generic name object.

6. The method as recited in claim 4, including a further step of
   providing additional details of attributes through comma separated values.

7. The method as recit4ed in claim 4, including a further step of
   editing a type name of an attribute.

8. The method as recited in claim 4, including a further step of
   editing a generic value object.

9. The method as recited in claim 4, including a further step of
   editing attributes of said software object.

10. The method as recited in claim 4, including a further step of
    storing said software object with said name object and value object prepended to said software object as a portion of a software program.

11. The method as recited in claim 4, including further steps of
    prepending another name object to said software object, wherein said another name object is of the same type or class as said name object, and
    prepending another value object to said software object, wherein said another value object is of a same type or class as said value object whereby another name value pattern is inherited by said software object.

12. The method as recited in claim 11, wherein said another name object and said another value object are associated with an attribute of said software object that is different from an attribute with which said name object and said value object are associated.

* * * * *